United States Patent
Olson (10) Patent No.: US 7,584,860 B2
(45) Date of Patent: *Sep. 8, 2009

(54) HYDROPHILIC BODY AND METHOD OF MANUFACTURE

(75) Inventor: Karmin Lorraine Olson, Kansas City, MO (US)

(73) Assignee: General Electric Company, Schenectady, NY (US)

( * ) Notice: Subject to any disclaimer, the term of this patent is extended or adjusted under 35 U.S.C. 154(b) by 60 days.

This patent is subject to a terminal disclaimer.

(21) Appl. No.: 11/457,871

(22) Filed: Jul. 17, 2006

(65) Prior Publication Data

US 2008/0011676 A1    Jan. 17, 2008

(51) Int. Cl.
*B01D 9/46* (2006.01)
*B01D 71/26* (2006.01)
*A61B 5/103* (2006.01)

(52) U.S. Cl. ............ 210/490; 210/500.36; 210/500.27; 427/244

(58) Field of Classification Search ................ 210/490, 210/500.27, 500.23, 500.28, 500.36, 640, 210/635; 95/45–55; 428/212; 424/304.4; 623/66; 427/244, 2.31, 532

See application file for complete search history.

(56) References Cited

U.S. PATENT DOCUMENTS

| | | | |
|---|---|---|---|
| 4,443,511 A * | 4/1984 | Worden et al. ............... 428/198 |
| 4,579,698 A | 4/1986 | Meyering et al. |
| 4,692,369 A * | 9/1987 | Nomi .......................... 428/198 |
| 4,738,782 A | 4/1988 | Yamauchi et al. |
| 4,787,976 A * | 11/1988 | Parham et al. ......... 210/500.23 |
| 4,813,966 A * | 3/1989 | Gilding et al. ............ 428/304.4 |
| 4,837,055 A * | 6/1989 | Bitter ......................... 427/244 |
| 4,872,982 A * | 10/1989 | Taylor ......................... 210/490 |
| 4,906,371 A | 3/1990 | Miller |
| 4,929,354 A | 5/1990 | Meyering et al. |
| 4,929,357 A * | 5/1990 | Schucker ..................... 210/640 |
| 5,086,173 A * | 2/1992 | Tritschler et al. ........... 544/211 |
| 5,203,997 A | 4/1993 | Koyama et al. |
| 5,279,856 A | 1/1994 | Koyama et al. |
| 5,282,965 A | 2/1994 | Urairi et al. |
| 5,317,072 A * | 5/1994 | Bokerman et al. ............. 528/12 |
| 5,387,621 A * | 2/1995 | Soldani ....................... 521/155 |
| 5,854,603 A * | 12/1998 | Heger ......................... 342/85 |
| 5,935,845 A * | 8/1999 | Koontz ..................... 435/283.1 |
| 5,948,707 A * | 9/1999 | Crawley et al. ............. 442/101 |
| 5,993,515 A * | 11/1999 | Sirkar ........................... 95/46 |
| 6,024,848 A | 2/2000 | Dufner et al. |
| 6,075,073 A * | 6/2000 | McGlothlin et al. ......... 523/310 |
| 6,159,369 A | 12/2000 | Strohm et al. |
| 6,615,537 B2 * | 9/2003 | Tonkin et al. ............. 47/58.1 R |
| 6,716,353 B1 * | 4/2004 | Mirzadeh et al. ............ 210/635 |
| 6,899,743 B2 * | 5/2005 | Wijmans et al. ................ 95/50 |
| 7,138,057 B2 * | 11/2006 | Debes et al. ............ 210/500.36 |
| 7,138,058 B2 * | 11/2006 | Kurth et al. ............. 210/500.38 |
| 7,144,621 B2 * | 12/2006 | Tanaka et al. ................ 428/212 |
| 7,166,224 B2 * | 1/2007 | Tonkin et al. ................ 210/640 |
| 7,189,322 B2 | 3/2007 | Wu et al. |
| 7,244,444 B2 * | 7/2007 | Bates .......................... 424/423 |
| 7,381,331 B2 * | 6/2008 | Duong et al. .......... 210/500.42 |

* cited by examiner

*Primary Examiner*—Ana M Fortuna
(74) *Attorney, Agent, or Firm*—Armstrong Teasdale LLP (57) ABSTRACT

A hydrophilic body includes a porous membrane with hydrophobic properties. The porous membrane includes at least one of expanded polytetrafluoroethylene, woven polytetrafluoroethylene, and non woven polytetrafluoroethylene. A coating is formed on at least a portion of the porous membrane. The coating has hydrophilic properties and includes at least one of an organofunctional siloxane and a polyether urethane polymer.

15 Claims, 4 Drawing Sheets

HYDROPHILIC BODY AND METHOD OF MANUFACTURE

BACKGROUND OF THE INVENTION

This invention relates generally to porous bodies, and more particularly to porous bodies having hydrophilic properties.

Fluoropolymers have excellent chemical and heat resistance properties and are generally hydrophobic. Expanded porous polytetrafluoroethylene (ePTFE) polymer membranes can be used as filter media for liquid filtration. However, because of the hydrophobicity of fluoropolymers, aqueous dispersions cannot readily be filtered through filters made from these fluoropolymers. Such ePTFE filters can be prewetted with organic solvents and then flushed with water to overcome the lack of affinity between the hydrophobic material and the polar aqueous dispersion. However, pre-wetting may be expensive and may lead to "gas-lock" or "dewetting."

Accordingly, there have been various attempts to make fluoropolymer membranes more hydrophilic and therefore more receptive to wetting with water while maintaining predetermined properties. Some known methods for making fluoropolymer membranes more hydrophilic include coating a surface of the membrane and the interior of pores of the membrane, with a hydrophilic coating, such as a fluorinated surfactant. However, because the fluoro-surfactant is bound to the membrane only by chemical affinity, the fluoro-surfactant may be inadvertently washed out by the aqueous medium, and as such, the fluoropolymer membrane may therefore lose its water-wettability. Other known methods for making fluoropolymer membranes more hydrophilic include cross-linking a fluoro-surfactant using a radiation beam such as Gamma ray, electron beam, or non-equilibrium plasma. Such cross-linking may not diffuse out the fluoropolymer membrane by the aqueous flow, however the radiation may weaken the mechanical strength of the fluoropolymer membrane. Moreover, the fluoro-surfactant may be adversely effected by the radiation, for example, through deterioration of the fluoro-surfactant and/or alteration of the fluoro-surfactants chemical properties.

Moreover, hydrophilic coatings are sometimes applied to the membrane before or after the membrane is laminated with a base material or substrate, such as a felt or a woven fabric. However, heat from some lamination processes that bond the membrane to the base material may damage the hydrophilic coating. Furthermore, laminated membranes may not be suitable for some applications because of possible contamination from either the spin finish on the felt or from any loose fibers from the non-laminated side of the filter that may work free over time.

BRIEF DESCRIPTION OF THE INVENTION

In one aspect, a hydrophilic body consists essentially of a porous membrane having hydrophobic properties, and a coating having hydrophilic properties. The porous membrane can be at least one of expanded polytetrafluoroethylene, woven polytetrafluoroethylene, and non woven polytetrafluoroethylene. The coating is formed on at least a portion of the porous membrane, wherein the coating has hydrophilic properties and comprises at least one of an organofunctional siloxane and a polyether urethane polymer.

In another aspect, a hydrophilic body consists essentially of a porous membrane having hydrophobic properties and comprising at least one of expanded polytetrafluoroethylene, woven polytetrafluoroethylene, and non woven polytetrafluoroethylene. A coating is formed on at least a portion of the porous membrane, wherein the coating has hydrophilic properties and includes at least one of an organofunctional siloxane and a polyether urethane polymer. The hydrophilic body does not include a base material.

In another aspect, a method for manufacturing a hydrophilic coating is provided. The method includes mixing a hydrophilic solid with a solvent, wherein the hydrophilic solid comprises at least one of an organofunctional siloxane and a polyether urethane polymer. The method further includes mixing an activator having an ammonium containing salt with the mixture of the solid and the solvent.

In another aspect, a method of making a hydrophilic body is provided. The method includes mixing an organofunctional siloxane and a solvent such that the organofunctional siloxane and the solvent form a coating solution. The coating solution is then applied to a porous membrane.

DETAILED DESCRIPTION OF THE INVENTION

Figure 1:
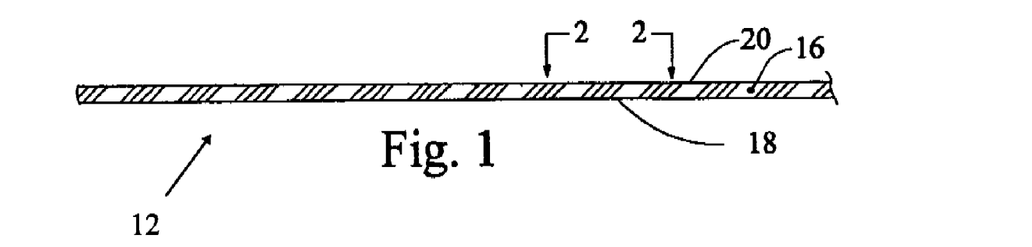
FIG. 1 is a schematic sectional view of an exemplary embodiment of a hydrophilic body.

The present invention relates to porous bodies used for filtering. FIG. 1 is a schematic sectional view of an exemplary embodiment of a membrane 16. Although membrane 16 may be used to filter anything, in some embodiments membrane 16 is used for liquid filtration, such as, but not limited to, aqueous liquids.

A coating composition 80 (discussed below) is applied to membrane 16 in forming a hydrophilic body 12. In one embodiment, hydrophilic body 12 is not attached or coupled to a base layer for support. Hydrophilic body 12 is generally hydrophilic such that it generally retains water wettability and can be dried and subsequently flow water with no special pre-wetting procedures. The term "hydrophilic" is used herein to describe the compatibility of a material with aqueous solutions and other polar solvents, or, in other words, the ability of a material to permit aqueous solutions and other polar solvents to wet out and pass through the material. In some embodiments hydrophilic body 12 is used to filter dilute acids and bases, photoresist, water (ambient and 80° C.), alkaline solutions, benzene, toluene, MEK, fruit juice, active pharmaceutical ingredients, and microlithography solutions.

Figure 2:
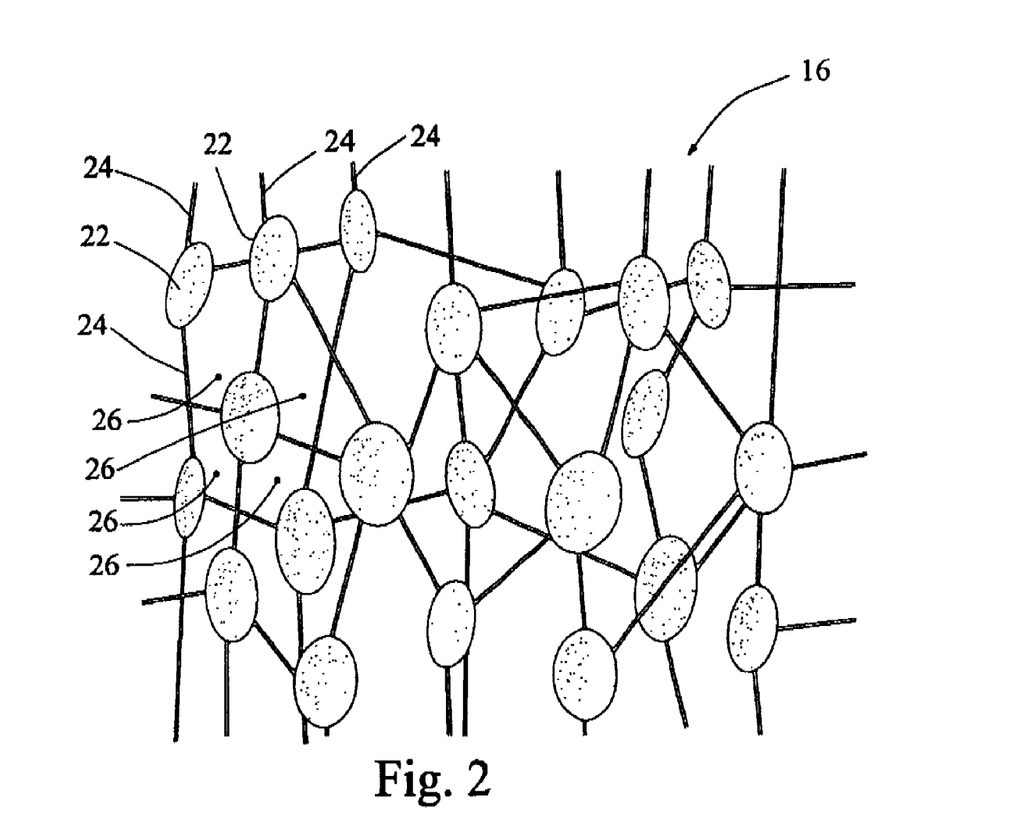
FIG. 2 is an enlarged schematic plan view of a portion of the exemplary hydrophilic body shown in FIG. 1.

FIG. 2 is an enlarged schematic plan view of a portion of membrane 16. Membrane 16 is porous, and in some embodiments microporous, with a three-dimensional matrix or lattice type structure of a plurality of nodes 22 interconnected by a plurality of fibrils 24. Membrane 16 is made from any suitable material, such as, but not limited to, expanded polytetrafluoroethylene (ePTFE) and/or a PTFE fabric. For example, membrane 16, in one exemplary embodiment, is made by extruding a mixture of polytetrafluoroethylene (PTFE) fine powder particles (e.g., available from DuPont of Wilmington, Del. under the name TEFLON® fine powder resin) and lubricant. The extrudate is then calendared. The calendared extrudate is then "expanded" or stretched in at least one direction to form fibrils 24 connecting nodes 22 in a three-dimensional matrix or lattice type of structure. "Expanded" is intended to mean sufficiently stretched beyond the elastic limit of the material to introduce permanent set or elongation to fibrils 24.

Membrane 16, in one exemplary embodiment, is heated or "sintered" to reduce and minimize residual stress in the ePTFE material. However, in alternate embodiments, membrane 16 is unsintered or partially sintered as is appropriate for the contemplated use of membrane 16. In some embodiments, the size of a fibril 24 that has been at least partially sintered is in the range of between about 0.05 micron and about 0.5 microns in diameter, taken in a direction normal to the longitudinal extent of fibril 24.

Other materials and methods can be used to form a suitable membrane 16 that has an open pore structure. For example, other suitable materials include, but are not limited to, polyolefin, polyamide, polyester, polysulfone, polyether, acrylic and methacrylic polymers, polystyrene, polyurethane, polypropylene, polyethylene, cellulosic polymer and combinations thereof. Other suitable methods of making a porous membrane 16 include, but are not limited to, foaming, skiving, or casting any of the suitable materials.

Surfaces of nodes 22 and fibrils 24 define numerous interconnecting pores 26 that extend completely through membrane 16 in a tortuous path. In some embodiments, the average size of pores 26 in membrane 16 is sufficient to be deemed microporous, but any pore size can be used. In one exemplary embodiment, a suitable average size for pores 26 in membrane 16 is between about 0.01 microns and about 10 microns, and in other embodiments between about 0.1 microns and about 5.0 microns. Moreover, in other embodiments a suitable average size for pores 26 in membrane 16 is between about 0.1 microns and about 1.0 microns. Further, in other embodiments a suitable average size for pores 26 in membrane 16 is between about 15 microns and about 0.5 microns.

Although membrane 16 may have any weight, in some embodiments membrane 16 has a weight of between about 0.05 and about 1 ounce per square yard. For example, in some embodiments membrane 16 has a weight of between about 0.1 and about 0.5 ounces per square yard.

Membrane 16 is generally hydrophobic, which is intended to mean that some liquids, such as, but not limited to, some aqueous liquids and other polar solvents, are incompatible with the material of membrane 16 such that the liquids do not wet out and pass through membrane 16 via membrane pores 26, unless substantial pressure is used to force the liquid through. Accordingly, membrane 16 may not allow flow of such incompatible liquids therethrough without using substantial pressure, and therefore may not be suitable for filtration of such incompatible liquids.

To describe what is meant by the "compatibility" of liquids and membrane 16, the concept of a liquid drop "wetting" a solid material will be briefly described. The physical and thermodynamic definition of "wetting" is based on the concepts of surface energy and surface tension. Liquid molecules are attracted to one another at their surfaces. This attraction tends to pull the liquid molecules together. Relatively high values of surface tension mean that the molecules have a strong attraction to one another and it is relatively more difficult to separate the molecules. The attraction varies depending on the type of molecule. For example, water has a relatively high surface tension value because the attraction in water molecules is relatively high due to hydrogen bonding, while some oils have relatively low surface tension values.

The concept of "wetting" is a function of the surface energy of a liquid ($'Y_{SL}$), the surface energy of a solid ($'Y_{SA}$) and the surface tension of a liquid ($Y_{LA}$), and is often described by the Young-Dupre equation below.

$$'Y_{SL} - 'Y_{SA} = Y_{LA} * \cos(\Theta) \quad (1)$$

Contact angle $\Theta$ is a measure of the angle defined between the surface of a liquid drop and the surface of a solid taken at the tangent edge of where the liquid drop contacts the solid, such that when the contact angle $\Theta$ is about 0°, a liquid will spread to a thin film over the solid surface. By comparison, a solid and liquid combination with a contact angle $\Theta$ of about 180° causes the liquid to form a spherical drop on the solid surface. When a contact angle $\Theta$ between about 0° and about 90° exists, a liquid will "wet" the solid it is contacting and the liquid will be drawn into pores, if any, existing in the surface of a solid. When the contact angle $\Theta$ is more than about 90°, a liquid will not wet the solid and there will be a force needed to drive the liquid into any existing pores in the solid.

Membrane 16 contains many interconnected pores 26 that fluidly communicate with environments adjacent to opposite facing side surfaces 18 and 20 (shown in FIG. 1). Therefore, the propensity of membrane 16 to permit a liquid material to wet out membrane 16 and pass through membrane pores 26, or, in other words, the compatibility of membrane 16 and the liquid, is a function of the surface energy of membrane 16, the surface tension of the liquid, the relative contact angle between membrane 16 and the liquid, and/or the size and/or effective flow area of membrane pores 26. One way to provide membrane 16 compatible with a liquid, is to provide membrane 16 with a surface tension and/or energy greater than the liquid, and a relative contact angle of between about 0° and about 90°. Surface energy and surface tension values are typically given in units of dynes/cm. Examples of surface energies and relative surface tensions are listed in the table below:

| Material | Surface Energy (dynes/cm) | Surface Tension (dynes/cm) |
|---|---|---|
| ePTFE | 30 | |
| Deionized water | | 72 |
| tap water | | varies with source |
| Acetone | | 23.5 |
| Isopropyl alcohol (100%) | | 20.9 |
| Ammonium Hydroxide (10%-30% Ammonia) | | 62 |

The more that the surface tension and/or energy of membrane 16 is above the surface tension of a particular liquid, and/or the more the relative contact angle is between about 0° and about 90°, the more likely the liquid will wet out membrane 16 and pass through membrane pores 26.

Figure 3:
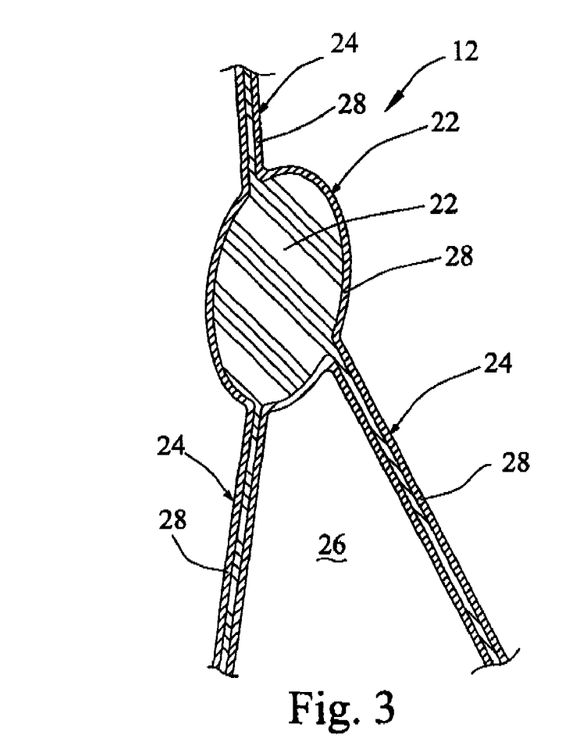
FIG. 3 is an enlarged schematic sectional view of a portion of the exemplary hydrophilic body shown in FIGS. 1 and 2 illustrating a coating formed on a membrane of the exemplary hydrophilic body.

FIG. 3 is an enlarged schematic sectional view of an exemplary embodiment of the present invention and illustrates a portion of hydrophilic body 12 with a coating 28 on membrane 16. Coating 28 derives from coating composition 80 (discussed below) and is a hydrophilic coating that may enhance hydrophilic properties of membrane 16. For example, coating 28 may increase the surface tension and/or energy of membrane 16 so at least some aqueous solutions and/or other polar solvents are capable of wetting membrane 16 and passing through membrane pores 26. Selecting a coating 28 with a predetermined surface energy and/or tension may therefore allow selective flow through membrane 16, and therefore hydrophilic body 12, of some aqueous solutions and/or other polar solvents. Moreover, coating 28 may provide a relative contact angle between membrane 16 and some aqueous solutions and/or other polar solvents of between about 0° and about 90°. Coating 28 includes coalesced solids having hydrophilic properties. Although coating 28 may include other hydrophilic solids, in some embodiments coating 28 is formed from a coating composition including organofunctional siloxane solids and/or polyether urethane polymer solids. For example, the hydrophilic solids used in coating 28, in some embodiments, come from mixtures of organofunctional siloxane solids, such as, but not limited to, mixtures of ECM/D6455* Hydrophilic Coating in Acetone (a mixture of about 100% acetone by volume with about 4-8% organofunctional siloxane solids, CAS 102783-01-7, having the Systematic Name siloxanes and silicones, di-Me, 3-hydroxypropyl group-terminated, ethoxylated), and/or ECM/D6453 Hydrophilic Coating, isopropyl alcohol (IPA)[†]. Also by way of example, in some embodiments the hydrophilic solids used in coating 28 are in the form of polyether urethane polymer solids, such as, but not limited to, Permax® 200[‡].

* Obtained from Whitford Corporation, 33 Sproul Road, Frazer, Pa. 19355
[†] Also available from Whitford Corporation.
[‡] Available from Noveon, Inc., 9911 Brecksville Road, Cleveland, Ohio 44141.

Coating composition 80 includes hydrophilic solids diluted in one or more suitable solvents. Although other solvents may be used, suitable solvents may include, but are not limited to, water, ethanol, IPA, acetone, methanol, n-propanol, n-butanol, N—N-dimethylformamide, methyl ethyl ketone and water soluble e- and p-series glycol ethers. Moreover, although the solvents may have other surface tensions, in some embodiments, coating composition 80 includes a solvent having a surface tension of less than about 31 dynes per centimeter. Moreover, in some embodiments, to form coating composition 80 that will form coating 28, a mixture of hydrophilic solids and solvent is mixed with a hydrophilic activator, which delivers ammonia to the solution. Any ammonia-containing salt should work, such as, but not limited to, ammonium hydroxide.

Although the coating composition may include other amounts, in some embodiments, coating composition 80 includes an amount of hydrophilic solids in the range of about 0.1 wt % to about 10 wt % based on a total weight of coating composition 80. For example, in some embodiments, the coating composition includes hydrophilic solids in the range of about 1.0 wt % to about 3.0 wt %. One example of an embodiment of a coating composition used to form coating 28 includes organofunctional siloxane solids in the range of about 1.0 wt % to about 2.0 wt %. Another example of an embodiment of a coating composition used to form coating 28 includes polyether urethane polymer solids in the range of about 2.0 wt % to about 3.0 wt %.

Although coating composition 80 may include other amounts of solvents, in some embodiments, coating composition 80 includes an amount of solvents in the range of about 40 wt % to about 99.9 wt %, including water and/or other solvents. In some embodiments, and for example, coating composition 80 includes an amount of solvents, other than water, in the range of about 50 wt % to about 75 wt %.

Coating composition 80 can further include a stabilizing agent. Although coating composition 80 may include other amounts of stabilizing agent, in some embodiments the coating composition includes an amount of stabilizing agent in the range of about 5 wt % to 50 wt %. For example, in some embodiments the coating composition includes an amount of stabilizing agent in the range of about 15 wt % to about 25 wt %.

Moreover, although coating composition 80 may include other amounts of hydrophilic activator, in some embodiments the coating composition forming coating 28 includes an amount of hydrophilic activator in the range of about 0.1 wt % to about 1.0 wt %. For example, in some embodiments the coating composition includes an amount of hydrophilic activator in the range of about 0.15 wt % to about 0.35 wt %.

One example of an embodiment of making a coating composition that will be applied to membrane 16 to form coating 28 includes providing a mixture of organofunctional siloxane solids and solvent, such as, but not limited to, ECM/D6455 Hydrophilic Coating in Acetone (a mixture of a solution of about 100% acetone by volume with about 6% organofunctional siloxane solids) and/or ECM/D6453 (a mixture of a solution of about 100% IPA by volume with about 6% organofunctional siloxane solids). The mixture of organofunctional siloxane solids is then diluted about 1:1 with a hydrophilic activator solution of about 98% IPA, about 1% water, and about 1% ammonium hydroxide (such as, but not limited to, greater than 25% as ammonia) by volume. The diluted mixture is then further diluted about 1:1 with IPA to form a coating composition having about 1.5 wt % organofunctional siloxane solids. Of course, the coating composition described herein is not limited to the coating composition, or the method of making the coating composition, described in this paragraph. Rather, the coating composition described in this paragraph and the method of making such coating composition are exemplary only.

Another example of an embodiment of making coating composition 80 that will be applied to membrane 16 to form coating 28 includes providing polyether urethane polymer solids, such as, but not limited to, Permax® 200, which is about 35% solids. The polyether urethane polymer solids are diluted about 5:95 with water to form a coating composition having about 2.5% solids. Of course, the coating composition described herein is not limited to the coating composition, or the method of making the coating composition, described in this paragraph. Rather, the coating composition described in this paragraph and the method of making such coating composition are exemplary only.

In some embodiments, coating composition 80 that forms coating 28 is generally compatible with membrane 16 such that the coating composition will pass through membrane pores 26 and "wet-out" surfaces of membrane 16 to form a continuous, conformal coating 28. For example, the coating composition has a surface tension and a relative contact angle that enable the coating composition to wet membrane 16 such that membrane surfaces, including surfaces of membrane pores 26, are coated with the hydrophilic solids in the coating composition.

Alternatively, in some embodiments, membrane 16 is wet with a solution containing a solvent before the coating composition is applied to membrane 16 such that the coating composition will pass through membrane pores 26 and "wet-out" surfaces of membrane 16. For example, in some embodiments wherein the coating composition includes polyether urethane polymer solids, a solution of about 75% IPA and about 25% water by volume is applied to membrane 16 before applying the coating composition. In some embodiments, a stabilizing agent and/or solvent is used to dilute "as purchased" hydrophilic solids to a dispersion having a predetermined solids content. It may be desirable to increase a ratio of the stabilizing agent to solvent to increase a stability of the coating composition. However, enough solvent must be present to ensure wetting of membrane 16 and flow of the coating composition into membrane pores 26.

Generally, and as will be described in more detail below, coating composition 80 is applied to membrane 16 to wet the surfaces of nodes 22 and fibrils 24 that define membrane pores 26, as well as side surfaces 18 and/or 20. The viscosity of coating composition 80 and the amount and type of hydrophilic solids in composition 80 may depend on several factors. These factors include the affinity of the solids to adhere and conform to the surfaces of nodes 22 and fibrils 24 that define membrane pores 26, the final solids content within coating 28, the coating process, and/or whether abuse of membrane 16 during preparation of hydrophilic body 12 for use, during use, and/or during maintenance (such as, but not limited to, removal of captured particles) may crack, dislodge, damage or disrupt coating 28.

Coating composition 80 is applied to membrane 16 such that substantially all of the surfaces of the nodes 22 and fibrils 24, as well as surfaces 18 and 20, are at least partially wetted and membrane pores 26 are not blocked. The coating composition adheres and conforms to the surfaces of nodes 22 and fibrils 24 that define membrane pores 26, in addition to surfaces 18 and/or 20. It is not necessary that coating composition 80 completely encapsulate the entire surface of a node 22 or fibril 24 (or of surfaces 18 and/or 20) or be continuous to increase hydrophilicity of membrane 16, and therefore hydrophilic body 12. The coating composition is then cured by heating membrane 16 such that the hydrophilic solids flow and coalesce, and such that the stabilizing agents and solvents are removed. During the application of heat, the thermal mobility of the hydrophilic solids allows the solids to be mobile and flow around, engage, and adhere to surfaces 18 and/or 20, nodes 22, and fibrils 24, and therefore coalesce to form coating 28. The finished coating 28 results from coalescing the hydrophilic solids on as many of the surfaces of nodes 22 and fibrils 24 defining membrane pores 26, as well as surfaces 18 and/or 20, as possible.

Figure 4:
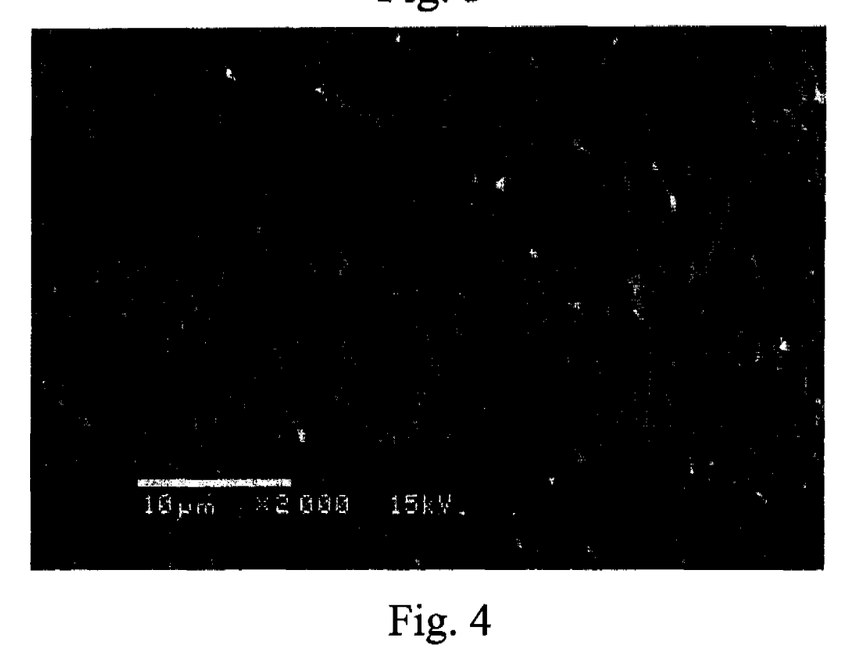
FIG. 4 is a scanning electron microscope (SEM) photomicrograph of a portion of the porous membrane of the exemplary hydrophilic body shown in FIG. 1.

FIG. 4 is a scanning electron microscope (SEM) photomicrograph of a portion of membrane 16 having coating 28 thereon. The coalesced hydrophilic solids provide coating 28 that improves hydrophilic properties of membrane 16 but does not completely block or "blind" membrane pores 26, which could adversely affect liquid permeability through hydrophilic body 12. It can be seen from FIG. 4 that membrane pores 26 are not completely blocked. It will be apparent that some pores 26 in membrane 16 could be blocked, but such blockage is minimal and dependent on variables in the coating process and structure of membrane 16. Coating 28, thus, may improve or modify the hydrophilicity of the material of membrane 16 such that membrane 16 allows some liquids to wet out and pass through membrane 16, and therefore hydrophilic body 12. For example, coating 28 increases a surface tension and/or energy of membrane 16 to provide membrane 16 with a surface tension that is greater than some liquids, and a relative contact angle of between about 0° and about 90°.

In some embodiments, hydrophilic body 12 is liquid permeable to a sufficient degree for filtration of liquid, such as, but not limited to, filtration of aqueous liquids. Although hydrophilic body 12 may have other water permeabilities, in some embodiments, hydrophilic body 12 has a water permeability of between about 5 and about 60 milliliters per minute per square centimeter at about 27 inches of mercury vacuum, and in other embodiments, of between about 10 and about 40 milliliters per minute per square centimeter.

In some embodiments, hydrophilic body 12 generally retains water wettability and can be dried and subsequently flow liquid with no special pre-wetting procedures. More specifically, in some embodiments hydrophilic body 12 has a water permeability of at least about 5 milliliters per minute per square centimeter at about 27 inches of mercury vacuum after at least 3 wet then dry cycles. In some embodiments, hydrophilic body 12, has a water permeability of at least about 5 milliliters per minute per square centimeter after at least 5 wet then dry cycles. Moreover, in some embodiments hydrophilic body 12 has a water permeability of at least about 10 milliliters per minute per square centimeter after at least 10 wet then dry cycles. Moreover, in some embodiments hydrophilic body 12 has a water permeability of at least about 15 milliliters per minute per square centimeter after at least 10 wet then dry cycles.

Although hydrophilic body 12 may have other air permeabilities, in some embodiments hydrophilic body 12 has an air permeability of at between about 0.01 and about 10 cubic feet per minute (CFM) per square foot of membrane 16, and in other embodiments, between about 0.2 and about 0.6 CFM per square foot of membrane 16, as measured by ASTM D737 testing.

Figure 5:
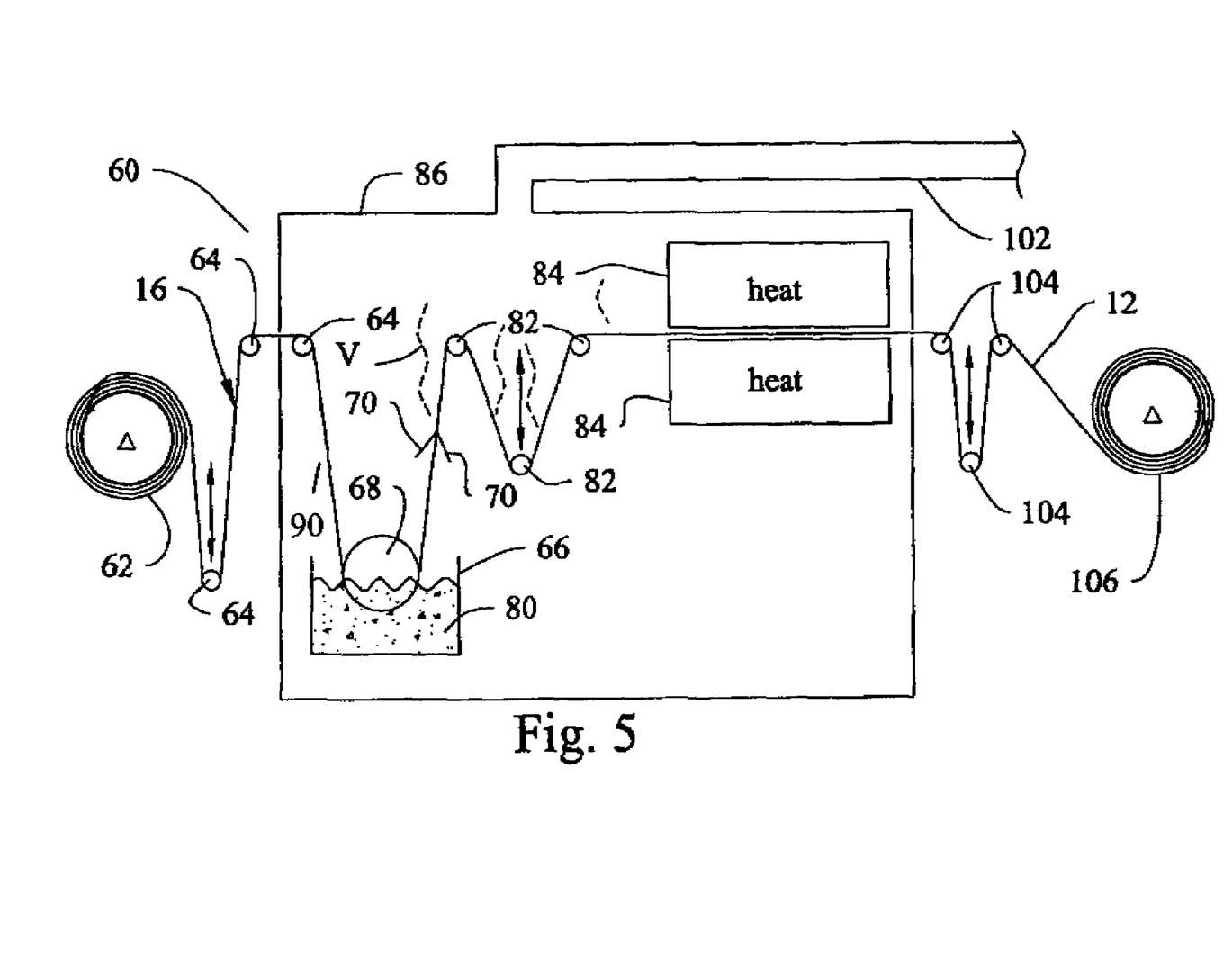
FIG. 5 is a schematic view of an exemplary embodiment of a system for fabricating the exemplary hydrophilic body shown in FIG. 1.

FIG. 5 is a schematic view of an exemplary embodiment of a system 60 for fabricating a hydrophilic body, such as hydrophilic body 12. A similar system is found in U.S. Pat. No. 6,410,084 to Klare et al., which is herein incorporated by reference. However, coating composition 80 can be applied to membrane 16 using any suitable process, such as, but not limited to, roll-coating, immersion (dipping), and/or spraying.

FIG. 5 illustrates system 60 for use in the method of treating membrane 16. The method includes providing the membrane 16 with surfaces defining a plurality of pores 26 extending through the membrane. In one embodiment, the average size of the pores 26 in membrane 16 is sufficiently small to qualify as microporous. In one embodiment, membrane 16 is made from ePTFE.

In some embodiments, membrane 16, and therefore hydrophilic body 12, is not laminated with a base material.

Membrane 16 is unreeled from a roll 62 and trained over rollers 64. A coating composition 80 for forming coating 28 (as described above) can be applied to the membrane 16 by any suitable conventional method, for example, by roll-coating, immersion (dipping), spraying, or the like. In one embodiment, a spraying device 90 sprays coating composition 80 onto membrane 16. Membrane 16 is then directed into a holding tank or reservoir 66 (containing coating composition 80) over an immersion roller 68. Coating composition 80 impregnates the membrane 16, wets the surfaces of the nodes 22 and fibrils 24 that define the pores 26 and the surfaces that define the major sides 18, 20. In other embodiments, spraying device 90 or a plurality of spraying devices 90 repeatedly or continuously spray coating composition 80 onto membrane 16 until the desired amount is achieved. In other embodiments, only reservoir 66 is used.

Coating composition 80 has a surface tension and relative contact angle so coating composition 80 can wet all surfaces of the membrane 16. As membrane 16 is immersed in coating composition 80, surfaces of membrane 16 that define pores 26 are engaged, wetted and coated by the coating composition.

Treated membrane 16 is directed out of reservoir 66. A mechanism 70, such as a pair of squeegees or doctor blades, engages opposite major sides 18, 20 of treated membrane 16. The doctor blades of mechanism 70 spread coating composition 80 and remove excess coating composition 80 from treated membrane 16 to minimize the chance of blocking pores 26 in membrane 16. Any other suitable means for removing the excess coating composition 80 may be used, such as an air knife.

Treated membrane 16 then exits the doctor blade of mechanism 70. Treated membrane 16 is then trained over rollers 82. The wetting agent and any other fugitive materials, such as water or acetone is subsequently removed by air drying or other drying methods. The wetting agent typically evaporates by itself but the evaporation can be accelerated by applying relatively low heat, for example at least to about 150° F., when IPA is the wetting agent. Wetting agent vapor V then moves away from treated membrane 16.

Treated membrane 16 is then directed to an oven with heat sources 84 for removing vapor V and coalescing the hydrophilic solids in order to form coating 28 onto membrane 16 (forming hydrophilic body 12). It may be necessary or desirable to enclose or vent reservoir 66 and heat sources 84 with a hood 86. Hood 86 may be vented to a desired location through a conduit 102. Hood 86 removes and captures vapor V, such as, fugitive wetting agent and emulsifiers, from treated membrane 16 and directs the captured material to a location for storage or disposal. Heat sources 84 could each have two heating zones. The first zone would be a "drying zone" to apply relatively low heat to treated membrane 16 for example 150° F., to evaporate any fugitive wetting agents that have not evaporated yet. The second zone would be a "curing zone" to coalesce the hydrophilic solids.

Test Descriptions:

Wetting Test

A liquid, such as water, is sprayed or dropped onto the surface of a sample of test material to visually assess the wet state and the extent of infiltration of the liquid into the material. When wetted and penetrated by the test liquid, the samples generally change in appearance from opaque or semi-transparent to transparent.

Water Permeability Test

Water Permeability is measured using a vacuum filtration apparatus. The time for a measured volume of water to flow through a given surface area of a test material at a predetermined pressure is recorded, and the flow rate is calculated therefrom.

Air Permeability Test

Air permeability is measured by a Frazier Air Permeability Tester per ASTM D737 or on a Textest FX 3300 Air Permeability Tester.

Without intending to limit the scope of the methods and articles described and/or illustrated herein, the following examples demonstrate how embodiments of the bodies and methods described and/or illustrated herein may be practiced. Test results are provided below to demonstrate the experiments performed and the methodology used.

EXAMPLES

A coating composition was made by mixing 50 ml of ECM/D6455 with 50 ml of hydrophilic activator, and then adding 100 ml of IPA. Using five different samples of ePTFE membranes that had a nominal pore size of approximately 0.45 microns*, the coating composition was then spray-coated onto both sides of each membrane. The ePTFE membranes were suspended in embroidery hoops and allowed thirty seconds of dwell time, and then dried at 200° F. for anywhere from 9 to 53 minutes. Dry time was not a critical factor in the permanency of the treatment or the flow rate of the membrane, so flow rates for all samples were averaged together.

* Membranes manufactured by BHA Technologies, Inc., and designated QM022HPT

This process was repeated for two samples of ePTFE membranes having a nominal pore size of 0.2 microns[†], which were dried at 230° F. for ten minutes. Results were averaged together for each cycle.

[†] Membranes manufactured by BHA Technologies, Inc., and designated QM012HPT

Figure 6:
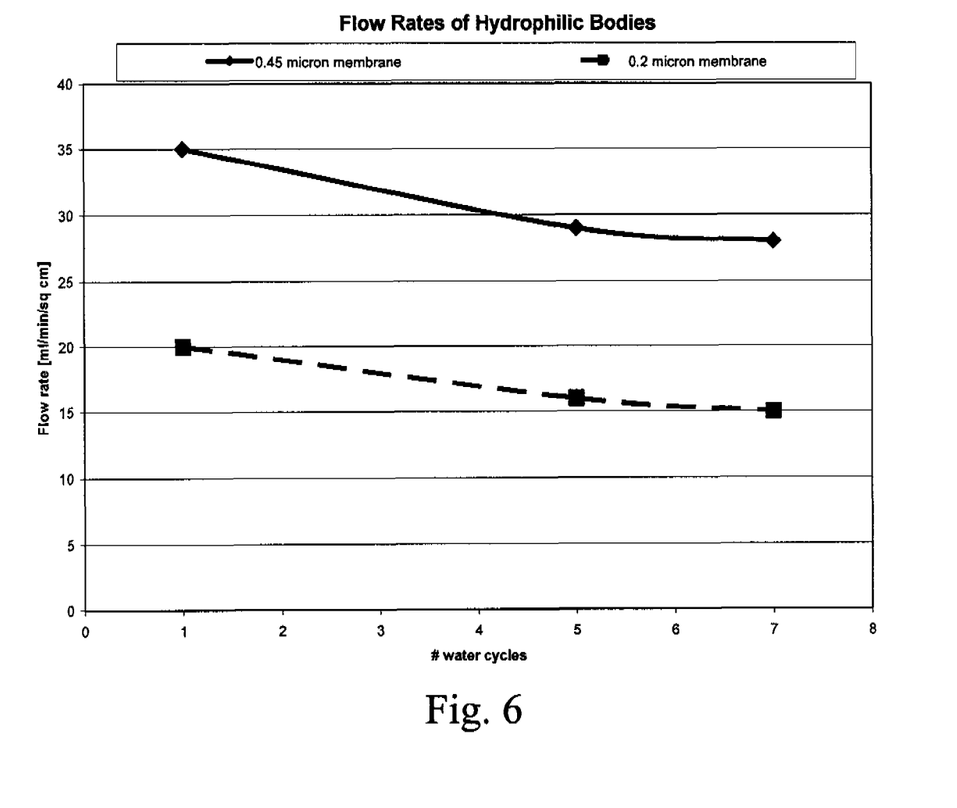
FIG. 6 is a graph illustrating water permeability of two exemplary hydrophilic bodies.

The water permeability of the hydrophilic bodies were then tested at a pressure of about 27 inches of mercury vacuum. FIG. 6 is a graph illustrating the flow rate of the bodies measured after the first, fifth, and seventh cycle. Each cycle represents 250 milliliters of water flowing through the membrane followed by drying at room temperature. As can be seen from FIG. 6, the bodies with membranes having a nominal pore size of 0.45 microns have a water permeability of at least about 28 milliliters per minute per square centimeter throughout the seven cycles, with very little loss of permeability after five cycles. The bodies with membranes having a nominal pore size of 0.2 microns have a water permeability of at least about 15 milliliters per minute per square centimeter throughout the seven cycles, with very little loss of permeability after five cycles.

A burnoff at 400° C. of the two bodies having membranes with 0.2 micron pore size showed an add-on weight of approximately 8-10% by weight.

Exemplary embodiments of articles and methods are described and/or illustrated herein in detail. The articles and methods are not limited to the specific embodiments described herein, but rather, components of each article and steps of each method may be utilized independently and separately from other articles and steps described herein. Each article component and method step can also be used in combination with other article components and/or method steps.

When introducing elements of the methods and articles described and/or illustrated herein, including any and all embodiment(s) thereof, the articles "a", "an", "the" and "said" are intended to mean that there are one or more of the elements. The terms "comprising", "including" and "having" are intended to be inclusive and mean that there may be additional elements other than the listed elements.

While the invention has been described in terms of various specific embodiments, those skilled in the art will recognize that the invention can be practiced with modification within the spirit and scope of the claims.

What is claimed is:

1. A hydrophilic body consisting essentially of:
   a porous membrane having hydrophobic properties and comprising expanded polytetrafluoroethylene, woven polytetrafluoroethylene, or non woven polytetrafluoroethylene, said expanded polytetrafluoroethylene comprising a plurality of nodes interconnected by a plurality of fibrils, each said node and said fibril having an outer surface, said woven polytetrafluoroethylene and said non-woven polytetrafluoroethylene comprising a plurality of polytetrafluoroethylene fibers, each said polytetrafluoroethylene fiber having an outer surface, said porous membrane having a plurality of pores; and
   a coating formed from a coating composition deposited on at least a portion of said surfaces of said nodes and fibrils, or said surfaces of said polytetrafluoroethylene fibers of said woven polytetrafluoroethane, or said surfaces of said polytetrafluoroethylene fibers of said non-woven polytetrafluoroethane without blocking said pores of said porous membrane, said coating having hydrophilic properties and comprising at least one of an organofunctional siloxane and a polyether urethane polymer, said hydrophilic body having a water permeability of between about 10 and about 40 milliliters per minute per square centimeter at about 27 inches of mercury vacuum, and said hydrophilic body retains water wettability and can be dried and subsequently flow liquid without pre-wetting.

2. A hydrophilic body in accordance with claim 1 wherein said membrane is not laminated with a base material.

3. A hydrophilic body in accordance with claim 2 wherein said membrane comprises a weight of between about 0.1 and about 0.5 ounces per square yard.

4. A hydrophilic body in accordance with claim 2 wherein said membrane having a nominal pore size of between about 0.1 and about 1.0 microns.

5. A hydrophilic body in accordance with claim 2 wherein said membrane having a nominal pore size of between about 0.15 and about 0.5 microns.

6. A hydrophilic body in accordance with claim 1 wherein said coating comprises a coating composition having between about 1.0 and about 3.0 wt % solids based on the total weight of said coating composition.

7. A hydrophilic body in accordance with claim 1 wherein said hydrophilic body comprises an air permeability of between about 0.2 and about 0.6 CFM per square foot as measured in accordance with ASTM D737.

8. A hydrophilic body in accordance with claim 1 wherein said hydrophilic body remains hydrophilic after at least five wet then dry cycles.

9. A hydrophilic body consisting essentially of:
a porous membrane having hydrophobic properties and comprising expanded polytetrafluoroethylene, woven polytetrafluoroethylene, non woven polytetrafluoroethylene, said expanded polytetrafluoroethylene comprising a plurality of nodes interconnected by a plurality of fibrils, each said node and said fibril having an outer surface, said woven polytetrafluoroethylene and said non-woven polytetrafluoroethylene comprising a plurality of polytetrafluoroethylene fibers, each said polytetrafluoroethylene fiber having an outer surfaces said porous membrane having a plurality of pores; and
a coating formed from a coating composition deposited on at least a portion of said surfaces of said nodes and fibrils, or said surface of said polytetrafluoroethylene fibers of said woven polytetrafluoroethane, or said surfaces of said polytetrafluoroethylene fibers of said non-woven polytetrafluoroethane without blocking said pores of said porous membrane, said coating having hydrophilic properties and comprising at least one of an organofunctional siloxane and a polyether urethane polymer,
said hydrophilic body having a water permeability of between about 10 and about 40 milliliters per minute per square centimeter at about 27 inches of mercury vacuum,
said hydrophilic body does not include a base material, and said hydrophilic body retains water wettability and can be dried and subsequently flow liquid without pre-wetting.

10. A hydrophilic body in accordance with claim 9 wherein said membrane having a nominal pore size of between about 0.15 and about 0.5 microns.

11. A hydrophilic body in accordance with claim 10 wherein said coating comprises a coating composition having between about 1.0 and about 3.0 wt % solids based on the total weight of said coating composition.

12. A method of making a hydrophilic body, said method comprising:
mixing organofunctional siloxane and a solvent such that the organofunctional siloxane and the solvent form a coating solution;
providing a porous membrane having hydrophobic properties and comprising expanded polytetrafluoroethylene, woven polytetrafluoroethylene, or non woven polytetrafluoroethylene, said expanded polytetrafluoroethylene comprising a plurality of nodes interconnected by a plurality of fibrils, each said node and said fibril having an outer surface, said woven polytetrafluoroethylene and said non-woven polytetrafluoroethylene comprising a plurality of polytetrafluoroethylene fibers, each said polytetrafluoroethylene fiber having an outer surface, said porous membrane having a plurality of pores;
applying the coating solution onto at least a portion of the surfaces of the nodes and fibrils, or the surface of the polytetrafluoroethylene fibers of the woven polytetrafluoroethane, or the surface of the polytetrafluoroethylene fibers of the non-woven polytetrafluoroethane without blocking the pores of the porous membrane to form the hydrophilic body having a water permeability of between about 10 and about 40 milliliters per minute per square centimeter at about 27 inches of mercury vacuum; and
retaining water wettability such that the hydrophilic body can be dried and subsequently flow liquid without pre-wetting.

13. A method in accordance with claim 12 wherein said method further comprises mixing an actuator in the coating solution.

14. A method in accordance with claim 12 further comprising curing the coating solution after the coating solution has been applied to the porous membrane at a temperature equal to or less than about 300° F.

15. A method in accordance with claim 14 wherein said curing the coating solution comprises curing the coating solution at a temperature between about equal to or less than about 250° F.

* * * * *